(12) United States Patent
Ogawa

(10) Patent No.: US 10,184,581 B2
(45) Date of Patent: Jan. 22, 2019

(54) RELIEF VALVE

(71) Applicant: KYB Corporation, Tokyo (JP)

(72) Inventor: Takayuki Ogawa, Kanagawa (JP)

(73) Assignee: KYB Corporation, Tokyo (JP)

( * ) Notice: Subject to any disclaimer, the term of this patent is extended or adjusted under 35 U.S.C. 154(b) by 58 days.

(21) Appl. No.: 15/113,967

(22) PCT Filed: Feb. 13, 2015

(86) PCT No.: PCT/JP2015/054009
§ 371 (c)(1),
(2) Date: Jul. 25, 2016

(87) PCT Pub. No.: WO2015/146353
PCT Pub. Date: Oct. 1, 2015

(65) Prior Publication Data
US 2016/0341324 A1 Nov. 24, 2016

(30) Foreign Application Priority Data

Mar. 24, 2014 (JP) ................................ 2014-060373

(51) Int. Cl.
| F16K 17/06 | (2006.01) |
| F16K 31/06 | (2006.01) |
| F16K 17/04 | (2006.01) |
| F16K 27/02 | (2006.01) |

(52) U.S. Cl.
CPC .......... *F16K 17/06* (2013.01); *F16K 17/0486* (2013.01); *F16K 17/065* (2013.01); *F16K 27/02* (2013.01); *F16K 31/0655* (2013.01)

(58) Field of Classification Search
CPC .... F16K 17/06; F16K 17/0486; F16K 17/065; F16K 27/02; F16K 31/0655
USPC ................................................... 137/382, 385
See application file for complete search history.

(56) References Cited

U.S. PATENT DOCUMENTS

| 1,743,350 | A | * | 1/1930 | Hopkins | ................. | F16K 17/06 |
| | | | | | | 123/90.52 |
| 2,327,953 | A | * | 8/1943 | Zoder | ..................... | F16K 17/06 |
| | | | | | | 403/361 |
| 2,884,952 | A | * | 5/1959 | Mason | ................ | F16K 17/0433 |
| | | | | | | 137/494 |

(Continued)

FOREIGN PATENT DOCUMENTS

JP 2001-074154 A 3/2001

*Primary Examiner* — P. Macade Nichols
(74) *Attorney, Agent, or Firm* — Rabin & Berdo, P.C.

(57) ABSTRACT

A relief valve includes: a case; a valve seat provided in a channel; a poppet valve that opens and closes the channel by being seated on and separated from the valve seat; a spring that biases, at a first end, the poppet valve in a direction in which the poppet valve is seated on the valve seat; an adjusting screw that is threaded into the case and changes, in accordance with a threaded depth, a distance between the valve seat and a bearing surface, which is in contact with a second end of the spring; and a positioning plate that has an engaging hole with which a projected portion of the adjusting screw is engaged such that relative rotation is not allowed and that restricts rotation of the adjusting screw by being fixed to an end surface of the case and by being brought into contact with the adjusting screw only at a side surface of the projected portion.

10 Claims, 7 Drawing Sheets

(56) References Cited

U.S. PATENT DOCUMENTS 6,095,183 A * 8/2000 Taylor .................... F16K 17/06
137/475

* cited by examiner

RELIEF VALVE

TECHNICAL FIELD

The present invention relates to a relief valve.

BACKGROUND ART

JP2001-74154A discloses a relief valve capable of adjusting relief pressure.

In the above-mentioned relief valve, by changing a threaded depth of an adjusting screw that is threaded to a case, it is possible to change compression amount of a spring that is provided between a valve body and the adjusting screw, in other words, it is possible to change biasing force exerted on the valve body by the spring. With such a configuration, it is possible to adjust the relief pressure at which the valve body is separated from a valve seat.

SUMMARY OF INVENTION

In the above-mentioned relief valve, a nut is tightened on a portion of the adjusting screw projecting out from an end surface of the case, and the adjusting screw is fixed by double nutting with a female screw of the case and the nut.

However, in the above-mentioned configuration, the adjusting screw may be rotated together when the nut is tightened, and in addition, axial force is generated on the adjusting screw. Accordingly, when the adjusting screw is fixed, the biasing force exerted on the valve body by the spring tends to change. Therefore, there is a problem in that it is difficult to adjust the relief pressure of the relief valve as desired.

An object of the present invention is to provide a relief valve that achieves easy adjustment of relief pressure.

According to one aspect of the present invention, a relief valve that is capable of adjusting relief pressure includes a case that includes an inflow port and an outflow port for working fluid, a valve seat that is provided in a channel through which the working fluid flows, a valve body that opens and closes the channel by being seated on and separated from the valve seat, a spring that biases, at a first end, the valve body in a direction in which the valve body is seated on the valve seat, an adjusting screw that has a projected portion projecting out from an end surface of the case and that is configured to change compression amount of the spring by being threaded into the case and by changing, in accordance with a threaded depth, a distance between the valve seat and a bearing surface, which is in contact with a second end of the spring, and a positioning plate that has an engaging hole with which the projected portion of the adjusting screw is engaged such that relative rotation is not allowed, the positioning plate being configured to restrict rotation of the adjusting screw by being fixed to the end surface of the case and by being brought into contact with the adjusting screw only at a side surface of the projected portion.

DESCRIPTION OF EMBODIMENTS

First Embodiment

A relief valve 100 according to a first embodiment of the present invention will be described below with reference to the attached drawings.

The relief valve 100 is a valve that is applied to, for example, a hydraulic apparatus (not shown), such as an actuator, a shock absorber, or the like, and that adjusts the pressure in the hydraulic apparatus to a predetermined relief pressure.

Figure 1:
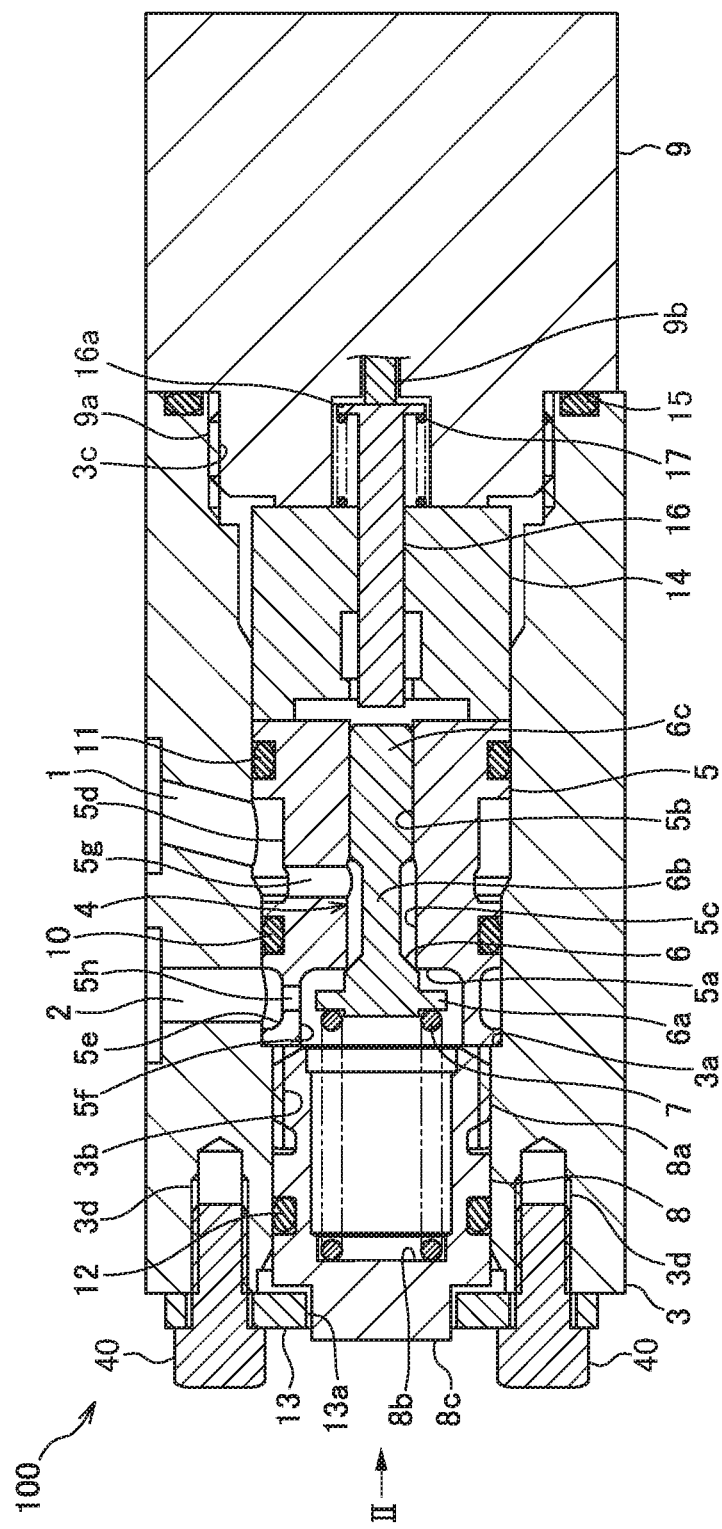
FIG. 1 is a sectional view of a relief valve according to a first embodiment of the present invention.

As shown in FIG. 1, the relief valve 100 includes a case 3 that has an inflow port 1 and an outflow port 2 for working oil, a valve case 5 that is accommodated in the case 3 such that a channel 4 through which the working oil passes is provided, a poppet valve 6 that serves as a valve body that opens and closes the channel 4 by being seated on and separated from a valve seat 5a provided in the valve case 5, a spring 7 that biases the poppet valve 6 in the direction in which the poppet valve 6 is seated on the valve seat 5a, an adjusting screw 8 that is threaded into the case 3 so as to compress the spring 7 with the poppet valve 6, and a proportional solenoid 9 that controls the relief pressure in a variable manner.

The relief valve 100 is connected to the hydraulic apparatus such that the inflow port 1 is in communication with a pressure chamber of the hydraulic apparatus and the outflow port 2 is in communication with a reservoir tank of the hydraulic apparatus.

The case 3 has a cylindrical shape and includes, on the inner circumferential side, a step portion 3a that is in contact with an end surface of the valve case 5 on the side of the valve seat 5a, a female screw 3b into which the adjusting screw 8 is threaded, and a female screw 3c into which the proportional solenoid 9 is threaded.

The valve case 5 has a cylindrical shape, and is inserted into the case 3 from the female screw 3c side. The position of the valve case 5 in the axial direction is defined by being brought into contact with the step portion 3a of the case 3.

The valve case 5 has a small-diameter portion 5b and a large-diameter portion 5c on an inner circumferential side thereof and annular grooves 5d and 5e on the outer circumferential side thereof. In addition, on an end surface of the valve case 5 that is in contact with the step portion 3a of the case 3, a recessed portion 5f is provided, and the large-diameter portion 5c opens to a bottom surface of the recessed portion 5f. The bottom surface of the recessed portion 5f serves as the valve seat 5a on which the poppet valve 6 is seated.

In a state in which the valve case 5 is brought into contact with the step portion 3a of the case 3, the annular groove 5d faces against the inflow port 1 and the annular groove 5e faces against the outflow port 2. In addition, the valve case 5 includes a through hole 5g that communicates the annular groove 5d with the large-diameter portion 5c and a through hole 5h that communicates the annular groove 5e and the recessed portion 5f.

With such a configuration, the inflow port 1 and the outflow port 2 are communicated through the channel 4 that is formed of the annular groove 5d, the through hole 5g, the large-diameter portion 5c, the recessed portion 5f, the through hole 5h, and the annular groove 5e.

On both sides of the annular groove 5d on the outer circumference of the valve case 5, O-rings 10 and 11 that prevent leakage of the working oil that has entered from the inflow port 1 side are disposed.

The poppet valve 6 has a spring-bearing portion 6a that is in contact with the spring 7, a small-diameter portion 6b, and a large-diameter portion 6c whose diameter is larger than that of the small-diameter portion 6b and substantially the same as that of the small-diameter portion 5b of the valve case 5. The poppet valve 6 is inserted into the valve case 5 such that the large-diameter portion 6c is brought into sliding contact with the small-diameter portion 5b of the valve case 5. In a state in which the poppet valve 6 is seated on the valve seat 5a, the channel 4 is blocked.

In a state in which the poppet valve 6 is seated on the valve seat 5a, a pressure receiving area of the poppet valve 6 that receives hydraulic pressure on the inflow port 1 side is set such that the pressure receiving area on the spring-bearing portion 6a side is greater than the pressure receiving area on the large-diameter portion 6c side. The pressure receiving area on the spring-bearing portion 6a side is the area obtained by subtracting the cross-sectional area of the small-diameter portion 6b of the poppet valve 6 from the cross-sectional area of the large-diameter portion 5c of the valve case 5. The pressure receiving area on the large-diameter portion 6c side is the area obtained by subtracting the cross-sectional area of the small-diameter portion 6b of the poppet valve 6 from the cross-sectional area of the large-diameter portion 6c of the poppet valve 6. Thus, as the hydraulic pressure on the inflow port 1 side rises, a thrust force acts on the poppet valve 6 in the direction in which the poppet valve 6 is separated from the valve seat 5a.

The thrust force acting on the poppet valve 6 is obtained by multiplying the area, which is obtained by subtracting the pressure receiving area on the large-diameter portion 6c side from the pressure receiving area on the spring-bearing portion 6a side, by the pressure on the inflow port 1 side.

The adjusting screw 8 has a bottomed cylindrical shape and is threaded into the female screw 3b of the case 3 with a male screw 8a formed on the outer circumference thereof. A bearing surface 8b that comes into contact with the spring 7 is provided on a bottom surface inside the adjusting screw 8.

An O-ring 12 for preventing leakage of the working oil to outside the relief valve 100 is disposed between the adjusting screw 8 and the case 3.

With the relief valve 100, by changing a threaded depth of the adjusting screw 8 relative to the case 3, it is possible to change compression amount of the spring 7 that is disposed between the poppet valve 6 and the adjusting screw 8. Because the spring 7 biases the poppet valve 6 in the direction in which the poppet valve 6 is seated on the valve seat 5a as described above, by adjusting the biasing force exerted on the poppet valve 6 by the spring 7 by changing the compression amount of the spring 7, it is possible to adjust the thrust force required for separating the poppet valve 6 from the valve seat 5a. In other words, it is possible to adjust the relief pressure of the relief valve 100.

Figure 2:
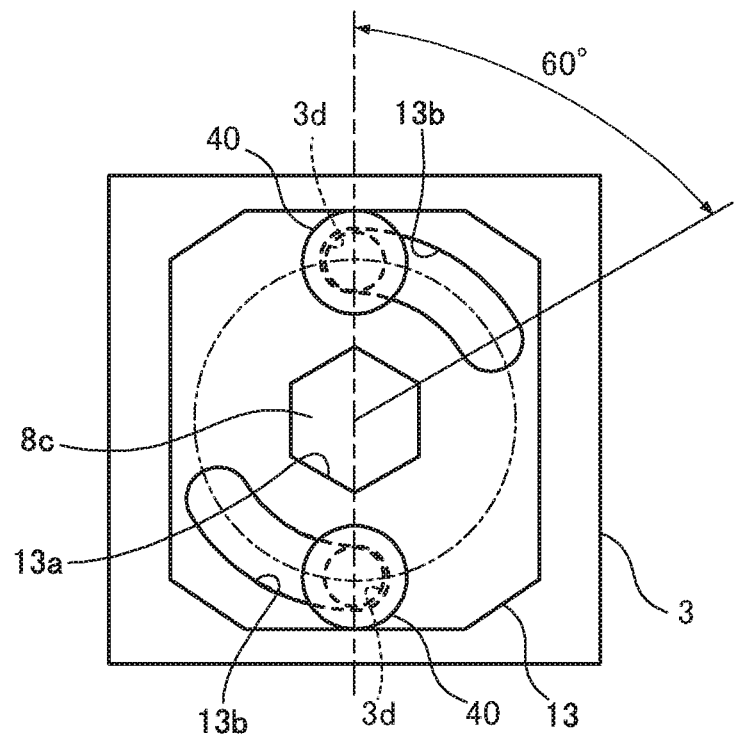
FIG. 2 is a view taken along the arrow II in FIG. 1.

On an end surface of the adjusting screw 8, a projected portion 8c is provided so as to project out from an end surface of the case 3. Rotation of the adjusting screw 8 is restricted by a positioning plate 13 that is engaged with the projected portion 8c, such that the relief pressure does not change after the adjustment. As shown in FIG. 2, the projected portion 8c of the adjusting screw 8 in this embodiment has a regular hexagonal shape.

The positioning plate 13 has an engaging hole 13a having a regular hexagonal shape, which is the same shape as that of the projected portion 8c of the adjusting screw 8, and with such a configuration, the positioning plate 13 is engaged with the projected portion 8c of the adjusting screw 8 such that relative rotation thereof is not allowed. Rotation of the adjusting screw 8 is restricted by engaging the positioning plate 13 with the projected portion 8c of the adjusting screw 8 and by fixing the positioning plate 13 on the end surface of the case 3 with bolts 40. Details of the positioning plate 13 will be described later.

Even when the threaded amount of the adjusting screw 8 into the case 3 is minimized within the adjustment range of the relief pressure, the adjusting screw 8 is set such that the portion other than the projected portion 8c does not project out from the end surface of the case 3. Accordingly, the positioning plate 13 is brought into contact with the adjusting screw 8 only at the side surfaces of the projected portion 8c.

Here, as another configuration for fixing the adjusting screw described above, it is possible to consider, for example, a configuration in which the nut is tightened to the adjusting screw that is projected from the end surface of the case, thereby fixing the adjusting screw by double nutting with the female screw of the case and the nut.

However, with the configuration in which the adjusting screw is fixed by double nutting, the adjusting screw may be rotated together when the nut is tightened, and in addition, axial force is generated on the adjusting screw. Therefore, there is a problem in that, when the adjusting screw is fixed, the biasing force exerted on the poppet valve by the spring tends to change.

In contrast, according to this embodiment, because rotation of the adjusting screw 8 is restricted by the positioning plate 13 that is fixed to the end surface of the case 3, it is possible to fix the adjusting screw 8 without changing the threaded depth into the case 3. In addition, because the positioning plate 13 is brought into contact with the adjusting screw 8 only at the side surfaces of the projected portion 8c, the axial force is not generated on the adjusting screw 8, and it is possible to prevent the change in the biasing force by the spring 7 due to the axial force.

The proportional solenoid 9 is fixed by being threaded into the female screw 3c of the case 3 at a male screw 9a.

A cylindrical shaft case 14 is provided between the proportional solenoid 9 and the valve case 5. The shaft case 14 is sandwiched, together with the valve case 5, by the step portion 3a of the case 3 and the proportional solenoid 9.

An O-ring 15 for preventing leakage of the working oil to outside the relief valve 100 is disposed between the proportional solenoid 9 and the case 3.

A shaft 16 is inserted into the inner circumference of the shaft case 14 in a slidable manner. In addition, a spring 17 is fit to the outer circumference of the shaft 16. A spring-bearing portion 16a is formed at an end portion of the shaft 16 on the proportional solenoid 9 side. The spring 17 is held by an end surface of the shaft case 14 and the spring-bearing portion 16a of the shaft 16.

When fixed to the case 3, the proportional solenoid 9 is brought into contact with the shaft 16 at a moving core 9b so as to compress the spring 17 via the shaft 16. Therefore, the shaft 16 is always biased towards the proportional solenoid 9 side by the spring 17.

When an electric current is passed through the proportional solenoid 9, the moving core 9b is pulled towards the case 3 side. Therefore, when an electric current is passed through the proportional solenoid 9, the moving core 9b moves the shaft 16 towards the poppet valve 6 side against the biasing force of the spring 17, thereby bringing the shaft 16 into contact with the poppet valve 6. With such a configuration, the thrust force by the proportional solenoid 9 is transmitted to the poppet valve 6.

With the above-mentioned configuration, the relief pressure of the relief valve 100 when an electric current is passed through the proportional solenoid 9 is determined by resultant force of the biasing force of the spring 7, the biasing force of the spring 17, and the thrust force by the proportional solenoid 9. Thus, with the relief valve 100, it is possible to control the relief pressure in a variable manner by changing a level of an electric current passing through the proportional solenoid 9.

With the relief valve 100, when an electric current is passed through the proportional solenoid 9, if the pressure on the inflow port 1 side is increased and the thrust force acting on the poppet valve 6 exceeds the above-mentioned resultant force, the poppet valve 6 is then separated from the valve seat 5a to relieve the pressure on the inflow port 1 side.

In addition, when an electric current is not passed through the proportional solenoid 9, the shaft 16 is separated from the poppet valve 6 by the reaction force of the spring 17. Therefore, the relief pressure of the relief valve 100 when an electric current is not passed through the proportional solenoid 9 is determined by the biasing force by the spring 7. Therefore, when the proportional solenoid 9 is failed, for example, the relief valve 100 operates as a passive relief valve. The same applies to a configuration without the proportional solenoid 9.

The positioning plate 13 will be described below.

As shown in FIG. 2, the positioning plate 13 has two slot holes 13b that are provided along the circumference centered on the rotation axis of the adjusting screw 8. The positioning plate 13 is fixed to the end surface of the case 3 by two bolts 40 that are respectively inserted into the two slot holes 13b.

Two female screws 3d of the case 3 are symmetrically disposed with respect to the rotation center of the adjusting screw 8. Similarly, the two slot holes 13b of the positioning plate 13 are symmetrically disposed with respect to the rotation center of the adjusting screw 8, in other words, with respect to the center of the engaging hole 13a. Accordingly, if the positioning plate 13 and the adjusting screw 8 are rotated in a state in which the bolts 40 are loosened, the two bolts 40 are simultaneously brought into contact with first ends of the slot holes 13b into which the bolts 40 are respectively inserted.

With the above-mentioned configuration, the positioning plate 13 and the adjusting screw 8 are allowed to rotate within a range from a position at which the bolts 40 are brought into contact with the first ends of the slot holes 13b to a position at which the bolts 40 are brought into contact with the second ends of the slot holes 13b.

In other words, an angle from a line passing through the centers of the bolts 40 and the center of the engaging hole 13a of the positioning plate 13 in a state in which the bolts 40 are brought into contact with the first ends of the slot holes 13b to a line passing through the centers of the bolts 40 and the center of the engaging hole 13a of the positioning plate 13 in a state in which the bolts 40 are brought into contact with the second ends of the slot holes 13b becomes rotatable angle of the positioning plate 13 and the adjusting screw 8. As shown in FIG. 2, in the positioning plate 13 of this embodiment, the slot holes 13b are provided such that the rotatable angle is 60 degrees.

Because the female screws 3d of the case 3, the slot holes 13b of the positioning plate 13, and the bolts 40 are required only to fix the positioning plate 13, the positioning plate 13 may be reduced in size by providing, for example, one female screw 3d, one slot hole 13b, and one bolt 40. In addition, the number of respective components may be three or more. If the number of respective components is three or more, they are disposed at equal intervals in the circumferential direction.

In this embodiment, the projected portion 8c of the adjusting screw 8 and the engaging hole 13a of the positioning plate 13 have the regular hexagonal shapes. In this case, while the adjusting screw 8 is rotated 360 degrees, the positioning plate 13 and the adjusting screw 8 are engaged at six positions at every 60 degrees. With such a configuration, it is possible to set the relief pressure of the relief valve 100 at every 60 degrees of the rotation of the adjusting screw 8.

As described above, with the relief valve 100, fine adjustment of the relief pressure is made possible by forming the projected portion 8c of the adjusting screw 8 and the engaging hole 13a of the positioning plate 13 so as to have the regular hexagonal shapes.

The projected portion 8c of the adjusting screw 8 and the engaging hole 13a of the positioning plate 13 may be formed so as to have other regular polygonal shapes than the regular hexagonal shapes. For example, if the projected portion 8c and the engaging hole 13a have square shapes, the relief pressure of the relief valve 100 can be set at every 90 degrees of the rotation of the adjusting screw 8, and if the projected portion 8c and the engaging hole 13a have regular pentagonal shapes, the relief pressure of the relief valve 100 can be set at every 72 degrees of the rotation of the adjusting screw 8.

Furthermore, according to this embodiment, because the slot holes 13b are formed as holes for fixing the positioning plate 13 with the bolts 40, it is possible to freely adjust the rotation angle of the adjusting screw 8 within the above-mentioned rotatable range. With such a configuration, it is possible to ensure a certain degree of freedom for the adjustable range of the relief pressure of the relief valve 100.

As described above, with the relief valve 100, the slot holes 13b of the positioning plate 13 are provided such that the rotatable angle becomes 60 degrees. Therefore, in a state in which the adjusting screw 8 and the positioning plate 13 are engaged at a predetermined position, it is possible to adjust the rotation angle of the adjusting screw 8 within the range of 60 degrees. With such a configuration, in combination with the fact that the positioning plate 13 and the adjusting screw 8 are engaged at six positions at every 60 degrees, it is possible to adjust the rotation angle of the adjusting screw 8 within the entire range over 360 degrees.

In other words, when the projected portion 8c of the adjusting screw 8 and the engaging hole 13a of the positioning plate 13 have regular n-sided polygons, by providing the slot holes 13b such that an angle from the line passing through the centers of the bolts 40 and the center of the engaging hole 13a of the positioning plate 13 in the state in which the bolts 40 are brought into contact with the first ends of the slot holes 13b to the line passing through the centers of the bolts 40 and the center of the engaging hole 13a of the positioning plate 13 in the state in which the bolts 40 are brought into contact with the second ends of the slot holes 13b becomes 360/n degrees or greater, it is possible to adjust the rotation angle of the adjusting screw 8 within the entire range over 360 degrees and it is possible to maximize the degree of freedom for adjustment of the relief pressure.

The positioning plate may be used by turning the positioning plate over. A case in which the positioning plate is used in both ways, with the front side out and the reverse side out, will be described below with reference to FIG. 3.

Figure 3:
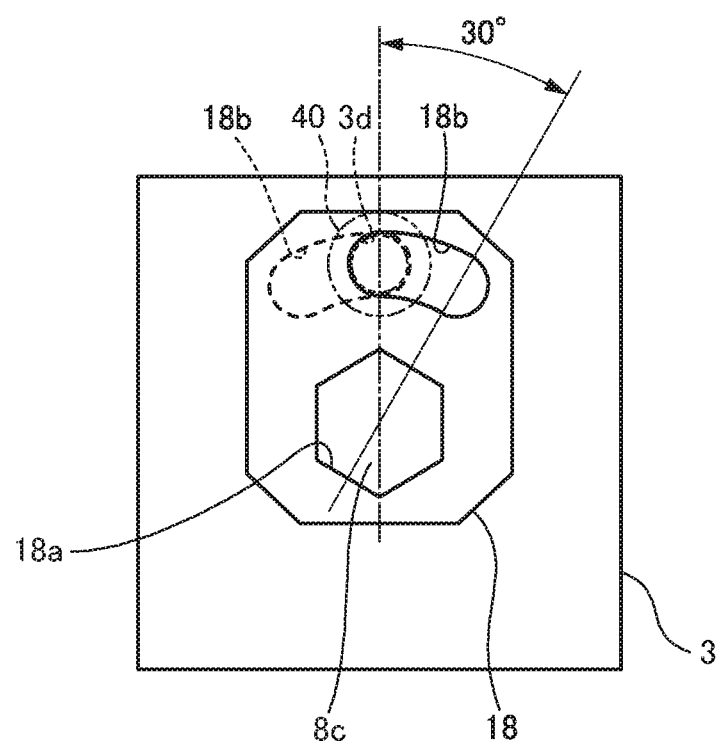
FIG. 3 is a diagram for explaining a modification of a positioning plate.

In an aspect shown in FIG. 3, the projected portion 8c of the adjusting screw 8 and an engaging hole 18a of a positioning plate 18 have, for example, regular hexagonal shapes.

A slot hole 18b illustrated by the solid line in FIG. 3 shows a hole position in a state in which the positioning plate 18, with the front side out, is engaged with the projected portion 8c of the adjusting screw 8. The slot hole 18b illustrated by the broken line shows a hole position in a state in which the positioning plate 18, with the reverse side out, is engaged with the projected portion 8c of the adjusting screw 8.

The slot hole 18b of the positioning plate 18 is provided such that a range from the state in which the center of the bolt 40 is positioned on a perpendicular bisector of a side of the regular hexagon to the state in which the center of the bolt 40 is positioned on the line that extends at an angle of 30 degrees with respect to the perpendicular bisector and passes through the center of the engaging hole 18a becomes the rotatable range of the positioning plate 18 and the adjusting screw 8.

Therefore, when the positioning plate 18 is used with the front side out, the positioning plate 18 and the adjusting screw 8 can be rotated 30 degrees in the counterclockwise direction from the state shown in FIG. 3. In addition, when the positioning plate 18 is used with the reverse side out, because the slot hole 18b is positioned at the position illustrated by the broken line in FIG. 3, the positioning plate 18 and the adjusting screw 8 can be rotated 30 degrees in the clockwise direction.

Therefore, according to the aspect shown in FIG. 3, by combining the rotatable range in the case of using the positioning plate 18 with the front side out and the rotatable range in the case of using the positioning plate 18 with the reverse side out, the rotatable angle of the positioning plate 18 and the adjusting screw 8 becomes 60 degrees.

As described above, when the projected portion 8c of the adjusting screw 8 and the engaging hole 18a of the positioning plate 18 have the regular hexagonal shapes, while the adjusting screw 8 is rotated 360 degrees, the positioning plate 18 and the adjusting screw 8 are engaged at six positions at every 60 degrees. Therefore, with the positioning plate 18, by using the positioning plate 18 with the front side out and the reverse side out, it is possible to adjust the rotation angle of the adjusting screw 8 within the entire range over 360 degrees.

In other words, when the projected portion 8c of the adjusting screw 8 and the engaging hole 18a of the positioning plate 18 have regular n-sided polygons and when the positioning plate 18 is used with the front side out and the reverse side out, by providing the slot hole 18b so as to include a range from the state in which the center of the bolt 40 is positioned on a perpendicular bisector of a side of the regular n-sided polygon to the state in which the center of the bolt 40 is positioned on the line that extends at an angle of 360/2n degrees with respect to the perpendicular bisector and passes through the center of the engaging hole 18a, it is possible to adjust the rotation angle of the adjusting screw 8 within the entire range over 360 degrees.

With such a configuration, it is possible to maximize the degree of freedom for setting the relief pressure, and in addition, it is possible to make the slot hole smaller compared with a case in which the positioning plate is used only with the front side out. Therefore, it is possible to reduce the size of the positioning plate.

Here, in the case in which the slot hole is provided such that the rotatable angle becomes 360/n degrees or greater, it is possible to adjust the rotation angle of the adjusting screw within the entire range over 360 degrees even when the positioning plate is used only with the front side out. Therefore, when the positioning plate is used with the front side out and the reverse side out, the slot hole may be provided such that the rotatable angle becomes less than 360/n degrees.

Figure 4:
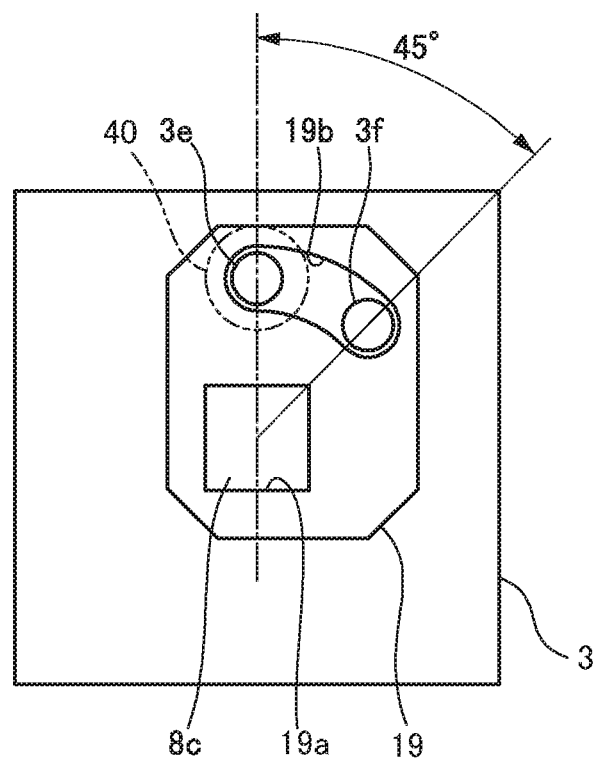
FIG. 4 is a diagram for explaining another modification of the positioning plate.

In addition, as shown in FIG. 4, by providing two female screws 3e and 3f on the end surface of the case 3 at a predetermined interval, a configuration in which a positioning plate 19 is fixed by threading the bolt 40 into one of the female screws 3e and 3f in accordance with the rotation angle of the positioning plate 19 may be employed.

In the aspect shown in FIG. 4, the projected portion 8c of the adjusting screw 8 and an engaging hole 19a of the positioning plate 19 have, for example, square shapes.

A slot hole 19b of the positioning plate 19 is provided such that, in the case in which the bolt 40 is threaded into one of the female screws 3e and 3f, an angle from the line passing through the center of the bolt 40 and the center of the engaging hole 19a of the positioning plate 19 in a state in which the bolt 40 is brought into contact with a first end of the slot hole 19b to the line passing through the center of the bolt 40 and the center of the engaging hole 19a of the positioning plate 19 in a state in which the bolt 40 is brought into contact with a second end of the slot hole 19b becomes 45 degrees.

The female screws 3e and 3f are provided on the end surface of the case 3 at an interval of 45 degrees centered on the rotation axis of the adjusting screw 8.

With such a configuration, as shown in FIG. 4, in the case in which the bolt 40 is threaded into the female screw 3e, the rotatable range of the positioning plate 19 and the adjusting screw 8 is 45 degrees in the counterclockwise direction. In addition, in the case in which the bolt 40 is threaded into the female screw 3f, the rotatable range of the positioning plate 19 and the adjusting screw 8 is 45 degrees in the clockwise direction. Therefore, by combining the case in which the bolt 40 is threaded into the female screw 3e and the case in which the bolt 40 is threaded into the female screw 3f, the rotatable angle of the positioning plate 19 and the adjusting screw 8 becomes 90 degrees.

When the projected portion 8c of the adjusting screw 8 and the engaging hole 19a of the positioning plate 19 have square shapes, while the adjusting screw 8 is rotated 360 degrees, the positioning plate 19 and the adjusting screw 8 are engaged at four positions every 90 degrees. Therefore, according to the aspect shown in FIG. 4, it is possible to adjust the rotation angle of the adjusting screw 8 within the entire range over 360 degrees.

In other words, when the projected portion 8c of the adjusting screw 8 and the engaging hole 19a of the positioning plate 19 have regular n-sided polygons, by providing the slot hole 19b such that an angle from the line passing through the center of the bolt 40 and the center of the engaging hole 19a of the positioning plate 19 in a state in which the bolt 40 is brought into contact with the first end to the line passing through the center of the bolt 40 and the center of the engaging hole 19a of the positioning plate 19 in a state in which the bolt 40 is brought into contact with the second end becomes 360/2n degrees or greater, and by providing the two female screws 3e and 3f on the end surface of the case 3 at the interval of 360/2n degrees centered on the rotation axis of the adjusting screw 8, it is possible to adjust the rotation angle of the adjusting screw 8 within the entire range over 360 degrees.

With such a configuration, it is possible to maximize the degree of freedom for setting the relief pressure, and in addition, it is possible to reduce the size of the slot hole as in the case in which the positioning plate is used with the front side out and the reverse side out. Therefore, it is possible to reduce the size of the positioning plate. In addition, because the positioning plate need not be turned over, it is possible to improve the ease of performing the relief pressure setting.

If the bolts 40 can be threaded into both of the female screws 3e and 3f, the positioning plate 19 may be fixed by using two bolts 40.

In addition, in a case in which the two female screws 3e and 3f are provided on the end surface of the case 3 at a predetermined interval, by using the positioning plate with the front side out and the reverse side out, it is possible to further reduce the size of the positioning plate.

For example, a case in which the female screws 3e and 3f are provided on the end surface of the case 3 at an interval of 45 degrees centered on the rotation axis of the adjusting screw 8 will be described with reference to FIGS. 5A and 5B.

Figure 5A:
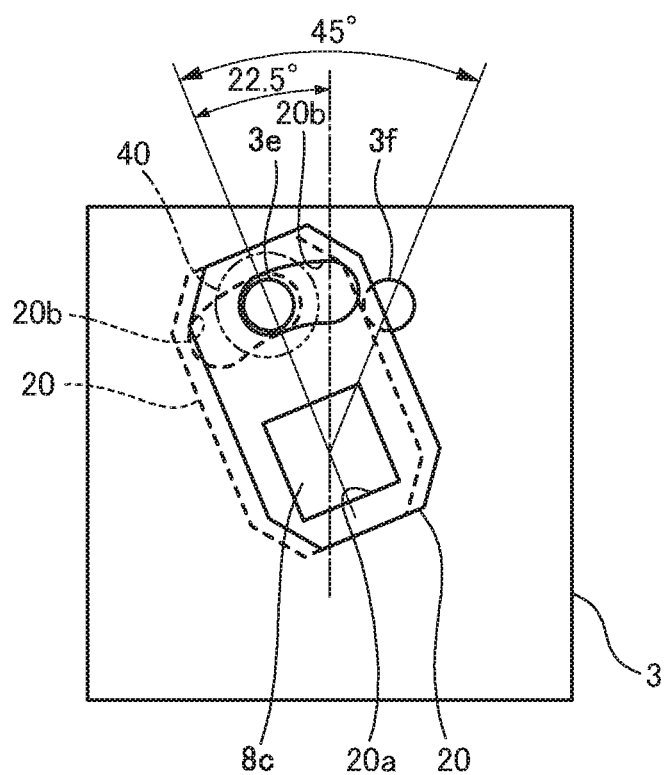
FIG. 5A is a diagram for explaining still another modification of the positioning plate.

A positioning plate 20 illustrated by the solid line in FIG. 5A shows a state in which, when the bolt 40 is threaded into the female screw 3e, the positioning plate 20, with the front side out, is engaged with the projected portion 8c of the adjusting screw 8. The positioning plate 20 illustrated by the broken line shows a state in which the positioning plate 20, with the reverse side out, is engaged with the projected portion 8c of the adjusting screw 8.

Figure 5B:
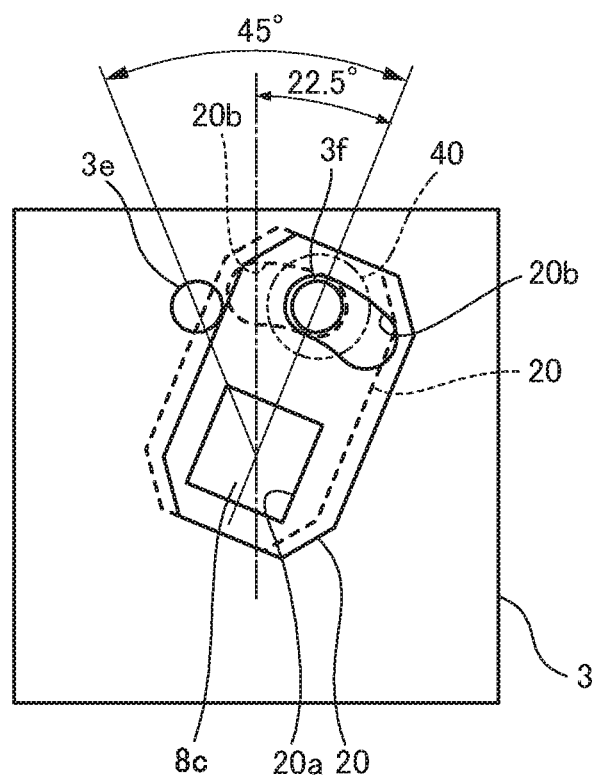
FIG. 5B is a diagram for explaining still another modification of the positioning plate.

In addition, the positioning plate 20 illustrated by the solid line in FIG. 5B shows a state in which, when the bolt 40 is threaded into the female screw 3f, the positioning plate 20, with the front side out, is engaged with the projected portion 8c of the adjusting screw 8. The positioning plate 20 illustrated by the broken line shows a state in which the positioning plate 20, with the reverse side out, is engaged with the projected portion 8c of the adjusting screw 8.

As shown in FIG. 5A, a slot hole 20b of the positioning plate 20 is provided such that, in the case in which the bolt 40 is threaded into the female screw 3e, a range from the state in which the center of the bolt 40 is positioned on a perpendicular bisector of a side of the square to the state in which the center of the bolt 40 is positioned on the line that extends at an angle of 22.5 degrees with respect to the perpendicular bisector and passes through the center of an engaging hole 20a becomes the rotatable range of the positioning plate 20 and the adjusting screw 8.

Therefore, in the case in which the bolt 40 is threaded into the female screw 3e and the positioning plate 20 is used with the front side out, the positioning plate 20 and the adjusting screw 8 can be rotated 22.5 degrees in the counterclockwise direction from the state shown in FIG. 5A. In addition, when the positioning plate 20 is used with the reverse side out, because the slot hole 20b is positioned at the position illustrated by the broken line in FIG. 5A, the positioning plate 20 and the adjusting screw 8 can be rotated 22.5 degrees in the clockwise direction.

Therefore, in the case in which the bolt 40 is threaded into the female screw 3e, with reference to the line passing through the center of the bolt 40 and the center of the engaging hole 20a, the rotatable range in the state in which the positioning plate 20 is used with the front side out and the rotatable range in the state in which the positioning plate 20 is used with the reverse side out are 22.5 degrees in the counterclockwise direction and the clockwise direction, respectively.

Also in the case in which the bolt 40 is threaded into the female screw 3f, as in the case in which the bolt 40 is threaded into the female screw 3e, with reference to the line passing through the center of the bolt 40 and the center of the engaging hole 20a, the rotatable range in the case in which the positioning plate 20 is used with the front side out and the rotatable range in the state in which the positioning plate 20 is used with the reverse side out are 22.5 degrees in the clockwise direction and the counterclockwise direction, respectively.

With such a configuration, the rotatable angle of the positioning plate 20 and the adjusting screw 8 becomes 90 degrees by combining the case in which the bolt 40 is threaded into the female screw 3e and the positioning plate 20 is used with the front side out, the case in which the bolt 40 is threaded into the female screw 3e and the positioning plate 20 is used with the reverse side out, the case in which the bolt 40 is threaded into the female screw 3f and the positioning plate 20 is used with the front side out, and the case in which the bolt 40 is threaded into the female screw 3f and the positioning plate 20 is used with the reverse side out.

When the projected portion 8c of the adjusting screw 8 and the engaging hole 20a of the positioning plate 20 have the square shapes, while the adjusting screw 8 is rotated 360 degrees, the positioning plate 20 and the adjusting screw 8 are engaged at four positions at every 90 degrees. Therefore, with the positioning plate 20, by using the positioning plate 20 with the front side out and the reverse side out, it is possible to adjust the rotation angle of the adjusting screw 8 within the entire range over 360 degrees.

In other words, when the projected portion 8c of the adjusting screw 8 and the engaging hole 20a of the positioning plate 20 have the regular n-sided polygons and when the positioning plate 20 is used with the front side out and the reverse side out, by providing the slot hole 20b so as to include a range from the state in which the center of the bolt 40 is positioned on a perpendicular bisector of a side of the regular n-sided polygon to the state in which the center of the bolt 40 is positioned on the line that extends at an angle of 360/4n degrees with respect to the perpendicular bisector and passes through the center of the engaging hole 20a, and by providing the two female screws 3e and 3f on the end surface of the case 3 at the interval of 360/2n degrees centered on the rotation axis of the adjusting screw 8, it is possible to adjust the rotation angle of the adjusting screw 8 within the entire range over 360 degrees.

With such a configuration, it is possible to maximize the degree of freedom for setting the relief pressure, and in addition, it is possible to make the slot hole smaller compared with a case in which the two female screws 3e and 3f are provided on the end surface of the case 3 at a predetermined interval and the positioning plate is used only with the front side out. Therefore, it is possible to further reduce the size of the positioning plate.

As described above, according to this embodiment, because rotation of the adjusting screw 8 is restricted by the positioning plate 13 that is fixed to the end surface of the case 3, it is possible to fix the adjusting screw 8 without changing the threaded depth into the case 3. In addition, because the positioning plate 13 is brought into contact with the adjusting screw 8 only at the side surfaces of the projected portion 8c, the axial force is not generated on the adjusting screw 8, and it is possible to prevent the change in the biasing force by the spring 7 due to the axial force. Therefore, it is possible to easily perform the adjustment of the relief pressure of the relief valve 100.

In addition, because the projected portion 8c of the adjusting screw 8 and the engaging hole 13a of the positioning plate 13 have the regular polygonal shapes, it is possible to engage the positioning plate 13 with the adjusting screw 8 at a plurality of positions while the adjusting screw 8 is rotated 360 degrees, and it is possible to finely adjust the relief pressure of the relief valve 100.

In addition, because the slot holes 13b are formed as holes for fixing the positioning plate 13 with the bolts 40, it is possible to adjust the rotation angle of the adjusting screw 8 within the range from the position at which the bolts 40 are brought into contact with the first ends of the slot holes 13b to the position at which the bolts 40 are brought into contact with the second ends of the slot holes 13b. With such a configuration, it is possible to ensure a certain degree of freedom for the adjustable range of the relief pressure of the relief valve 100.

In addition, when the projected portion 8c of the adjusting screw 8 and the engaging hole 13a of the positioning plate 13 have the regular n-sided polygons, by providing the slot holes 13b such that the angle from the line passing through the centers of the bolts 40 and the center of the engaging hole 13a of the positioning plate 13 in the state in which the bolts 40 are brought into contact with the first ends of the slot holes 13b to the line passing through the centers of the bolts 40 and the center of the engaging hole 13a of the positioning plate 13 in the state in which the bolts 40 are brought into contact with the second ends of the slot holes 13b becomes 360/n degrees or greater, it is possible to adjust the rotation angle of the adjusting screw 8 within the entire range over 360 degrees and it is possible to maximize the degree of freedom for adjustment of the relief pressure.

In addition, when the projected portion 8c of the adjusting screw 8 and the engaging hole 18a of the positioning plate 18 have the regular n-sided polygons and when the positioning plate 18 is used with the front side out and the reverse side out, by providing the slot hole 18b so as to include the range from the state in which the center of the bolt 40 is positioned on a perpendicular bisector of a side of the regular n-sided polygon to the state in which the center of the bolt 40 is positioned on the line that extends at the angle of 360/2n degrees with respect to the perpendicular bisector and passes through the center of the engaging hole 18a, it is possible to adjust the rotation angle of the adjusting screw 8 within the entire range over 360 degrees.

With such a configuration, it is possible to maximize the degree of freedom for setting the relief pressure, and in addition, it is possible to make the slot hole smaller compared with a case in which the positioning plate is used only with the front side out. Therefore, it is possible to reduce the size of the positioning plate.

In addition, when the projected portion 8c of the adjusting screw 8 and the engaging hole 19a of the positioning plate 19 have the regular n-sided polygons, by providing the slot hole 19b such that the angle from the line passing through the center of the bolt 40 and the center of the engaging hole 19a of the positioning plate 19 in the state in which the bolt 40 is brought into contact with the first end to the line passing through the center of the bolt 40 and the center of the engaging hole 19a of the positioning plate 19 in the state in which the bolts 40 is brought into contact with the second end becomes 360/2n degrees or greater and by providing the two female screws 3e and 3f on the end surface of the case 3 at the interval of 360/2n degrees centered on the rotation axis of the adjusting screw 8, it is possible to adjust the rotation angle of the adjusting screw 8 within the entire range over 360 degrees.

With such a configuration, it is possible to maximize the degree of freedom for setting the relief pressure, and in addition, it is possible to reduce the size of the slot hole as in the case in which the positioning plate is used with the front side out and the reverse side out. Therefore, it is possible to reduce the size of the positioning plate. In addition, because the positioning plate need not be turned over, it is possible to improve the ease of performing the relief pressure setting.

In addition, when the projected portion 8c of the adjusting screw 8 and the engaging hole 20a of the positioning plate 20 have the regular n-sided polygons and when the positioning plate 20 is used with the front side out and the reverse side out, by providing the slot hole 20b so as to include the range from the state in which the center of the bolt 40 is positioned on a perpendicular bisector of a side of the regular n-sided polygon to the state in which the center of the bolt 40 is positioned on the line that extends at the angle of 360/4n degrees with respect to the perpendicular bisector and passes through the center of the engaging hole 20a, and by providing the two female screws 3e and 3f on the end surface of the case 3 at the interval of 360/2n degrees centered on the rotation axis of the adjusting screw 8, it is possible to adjust the rotation angle of the adjusting screw 8 within the entire range over 360 degrees.

With such a configuration, it is possible to maximize the degree of freedom for setting the relief pressure, and in addition, it is possible to make the slot hole smaller compared with a case in which the two female screws 3e and 3f are provided on the end surface of the case 3 at a predetermined interval and the positioning plate is used only with the front side out. Therefore, it is possible to further reduce the size of the positioning plate.

Second Embodiment

In the following, a relief valve 200 according to a second embodiment of the present invention will be described with reference to FIG. 6.

The relief valve 200 is a passive relief valve without the proportional solenoid 9. In addition, a configuration of an adjusting screw is different from that of the relief valve 100. Differences from the relief valve 100 will be mainly described below, and components that are the same as those in the first embodiment are assigned the same reference numerals and a description thereof will be omitted.

Figure 6:
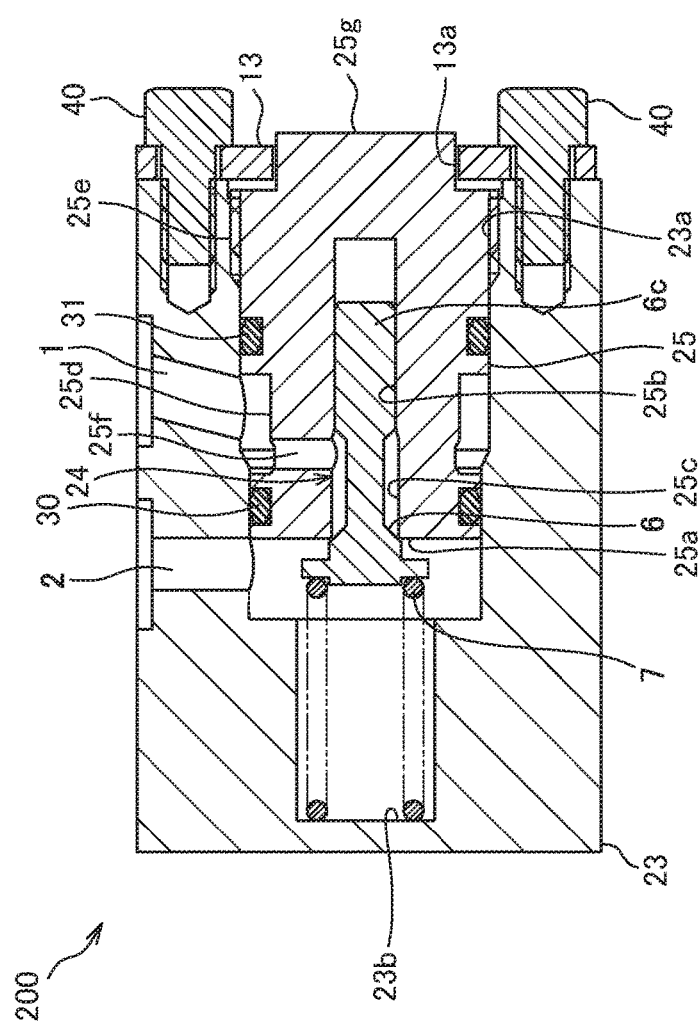
FIG. 6 is a sectional view of a relief valve according to a second embodiment of the present invention.

As shown in FIG. 6, the relief valve 200 includes a case 23 that has the inflow port 1 and the outflow port 2 for the working oil, a valve case 25 that is accommodated in the case 23 such that a channel 24 through which the working oil passes is provided, the poppet valve 6 that serves as a valve body that opens and closes the channel 24 by being seated on and separated from a valve seat 25a provided in the valve case 25, and the spring 7 that biases the poppet valve 6 in the direction in which the poppet valve 6 is seated on the valve seat 25a.

The case 23 has a bottomed cylindrical shape and includes, on the inner circumferential side, a female screw 23a into which the valve case 25 is threaded. In addition, a bearing surface 23b that comes into contact with the spring 7 is provided on a bottom surface inside the case 23.

The valve case 25 has a bottomed cylindrical shape and includes, on the inner circumferential side, a small-diameter portion 25b and a large-diameter portion 25c, and includes, on the outer circumferential side, an annular groove 25d and a male screw 25e, which is threaded into the female screw 23a of the case 23. An end surface of the valve case 25 on the opening side serves as the valve seat 25a on which the poppet valve 6 is seated.

The annular groove 25d is provided so as to face against the inflow port 1 in a state in which the valve case 25 is threaded into the case 23. In addition, the valve case 25 includes a through hole 25f that communicates the annular groove 25d with the large-diameter portion 25c.

With such a configuration, the inflow port 1 and the outflow port 2 are communicated through the channel 24 that is formed of the annular groove 25d, the through hole 25f, and the large-diameter portion 25c.

On both sides of the annular groove 25d on the outer circumference of the valve case 25, an O-ring 30 for preventing leakage of the working oil from the inflow port 1 side to the outflow port 2 side and an O-ring 31 for preventing leakage of the working oil to outside the relief valve 200 are disposed.

The poppet valve 6 is inserted into the valve case 25 such that the large-diameter portion 6c is brought into sliding contact with the small-diameter portion 25b of the valve case 25. In a state in which the poppet valve 6 is seated on the valve seat 25a, the channel 24 is blocked.

With the relief valve 200 of this embodiment, by changing the threaded depth of the valve case 25 into the case 23, it is possible to change the compression amount of the spring 7 disposed between the poppet valve 6 and the bearing surface 23b of the case 23.

In other words, the valve case 25 has a function that is similar to that of the adjusting screw 8 in the first embodiment. With such a configuration, it is possible to adjust the biasing force exerted on the poppet valve 6 by the spring 7, and it is possible to adjust the pressure at which the poppet valve 6 is separated from the valve seat 25a, in other words, the relief pressure of the relief valve 200.

In addition, on an end surface of the valve case 25 on the bottom side, a regular-polygonal-shaped projected portion 25g that projects out from an end surface of the case 23 is provided. Rotation of the valve case 25 is restricted by the positioning plate 13 that engages with the projected portion 25g such that the relief pressure does not change after the adjustment.

The positioning plate 13 has the engaging hole 13a having the regular polygonal shape, which is the same shape as that of the projected portion 25g of the valve case 25, and with such a configuration, the positioning plate 13 is engaged with the projected portion 25g of the valve case 25 such that relative rotation thereof is not allowed. The rotation of the valve case 25 is restricted by fixing the positioning plate 13 to the end surface of the case 23 with the bolts 40 in a state in which the positioning plate 13 is engaged with the projected portion 25g of the valve case 25.

In addition, even when the threaded amount of the valve case 25 into the case 23 is minimized within the adjustment range of the relief pressure, the valve case 25 is set such that the portion other than the projected portion 25g does not project out from the end surface of the case 23. Accordingly, the positioning plate 13 is brought into contact with the valve case 25 only at the side surfaces of the projected portion 25g.

As described above, according to this embodiment, because rotation of the valve case 25 is restricted by the positioning plate 13 that is fixed to the end surface of the case 23, it is possible to fix the valve case 25 without changing the threaded depth into the case 23. In addition, because the positioning plate 13 is brought into contact with the valve case 25 only at the side surfaces of the projected portion 25g, the axial force is not generated on the valve case 25, and it is possible to prevent the change in the biasing force by the spring 7 due to the axial force.

In addition, according to this embodiment, the valve case 25 functions as the adjusting screw for adjusting the relief pressure of the relief valve 200. With such a configuration, because the adjusting screw needs not be provided separately, it is possible to reduce the size of the relief valve 200 and to reduce the cost.

Embodiments of the present invention were described above, but the above embodiments are merely examples of applications of the present invention, and the technical scope of the present invention is not limited to the specific constitutions of the above embodiments.

For example, in the above-mentioned embodiment, although the relief valves 100 and 200 are described as devices to be applied to the hydraulic apparatus, they may be applied to a fluid pressure apparatus using liquid, gas, or the like other than the working oil.

In addition, in the aspect shown in FIG. 3 in the first embodiment, although one female screw is provided in the case 3, more than one female screw may be provided.

In addition, in the aspect shown in FIG. 4 and the aspects shown in FIGS. 5A and 5B in the first embodiment, although two female screws are provided in the case 3, more than two female screws may be provided.

With respect to the above description, the contents of application No. 2014-60373, with a filing date of Mar. 24, 2014 in Japan, are incorporated herein by reference.

The invention claimed is:

1. A relief valve that is capable of adjusting relief pressure comprising:
   a case that includes an inflow port and an outflow port for working fluid;
   a valve seat that is provided in a channel through which the working fluid flows;
   a valve body that closes and opens the channel by being seated on and separated from the valve seat;
   a spring that biases, at a first end, the valve body in a direction in which the valve body is seated on the valve seat;
   an adjusting screw that has a projected portion projecting out from an end surface of the case and that is configured to change a compression amount of the spring by being threaded into the case and by changing, in accordance with a threaded depth, a distance between the valve seat and a bearing surface, which is in contact with a second end of the spring; and
   a positioning plate that has an engaging hole with which the projected portion of the adjusting screw is engaged such that relative rotation is not allowed, the positioning plate being configured to restrict rotation of the adjusting screw by being fixed to the end surface of the case and by being brought into contact with the adjusting screw only at a side surface of the projected portion.

2. The relief valve according to claim 1, wherein the adjusting screw is integrally provided with the bearing surface, which is in contact with the second end of the spring.

3. The relief valve according to claim 1, wherein the adjusting screw is integrally provided with the valve seat.

4. A relief valve that is capable of adjusting relief pressure, comprising:
- a case that includes an inflow port and an outflow port for working fluid;
- a valve seat that is provided in a channel through which the working fluid flows;
- a valve body that closes and opens the channel by being seated on and separated from the valve seat;
- a spring that biases, at a first end, the valve body in a direction in which the valve body is seated on the valve seat;
- an adjusting screw that has a projected portion projecting out from an end surface of the case and that is configured to change a compression amount of the spring by being threaded into the case and by changing, in accordance with a threaded depth, a distance between the valve seat and a bearing surface, which is in contact with a second end of the spring; and
- a positioning plate that has an engaging hole with which the projected portion of the adjusting screw is engaged such that relative rotation is not allowed, the positioning plate being configured to restrict rotation of the adjusting screw by being fixed to the end surface of the case and by being brought into contact with the adjusting screw only at a side surface of the projected portion, wherein
- the projected portion of the adjusting screw and the engaging hole of the positioning plate have a regular polygonal shape.

5. The relief valve according to claim 4, wherein the positioning plate has a slot hole provided along a circumference centered on a rotation axis of the adjusting screw, the positioning plate being fixed to the case with a bolt that is inserted into the slot hole and threaded into a female screw provided in the case.

6. The relief valve according to claim 5, wherein
the engaging hole has a regular n-sided polygon, and
the slot hole is provided such that an angle from a line passing through a center of the bolt and a center of the engaging hole in a state in which the bolt is brought into contact with a first end to a line passing through the center of the bolt and the center of the engaging hole in a state in which the bolt is brought into contact with a second end becomes 360/n degrees or greater.

7. The relief valve according to claim 5, wherein
the engaging hole has a regular n-sided polygon, and
the slot hole is provided so as to include a range from a state in which a center of the bolt is positioned on a perpendicular bisector of a side of the regular n-sided polygon to a state in which the center of the bolt is positioned on a line that extends at an angle of 360/2n degrees with respect to the perpendicular bisector and that passes through a center of the engaging hole.

8. The relief valve according to claim 7, wherein the slot hole is provided such that an angle from a line passing through the center of the bolt and the center of the engaging hole in a state in which the bolt is brought into contact with a first end to a line passing through the center of the bolt and the center of the engaging hole in a state in which the bolt is brought into contact with a second end becomes less than 360/n degrees.

9. The relief valve according to claim 5, wherein
the engaging hole has a regular n-sided polygon, and
the slot hole is provided such that an angle from a line passing through a center of the bolt and a center of the engaging hole in a state in which the bolt is brought into contact with a first end to a line passing through the center of the bolt and the center of the engaging hole in a state in which the bolt is brought into contact with a second end becomes 360/2n degrees or greater,
the case has two female screws that are provided on the end surface at an interval of 360/2n degrees centered on the rotation axis of the adjusting screw, and
the positioning plate is fixed to the case with the bolt that is threaded into one of the two female screws.

10. The relief valve according to claim 5, wherein
the engaging hole has a regular n-sided polygon, and
the slot hole is provided so as to include a range from a state in which a center of the bolt is positioned on a perpendicular bisector of a side of the regular n-sided polygon to a state in which the center of the bolt is positioned on a line that extends at an angle of 360/4n degrees with respect to the perpendicular bisector and that passes through a center of the engaging hole,
the case has two female screws that are provided on the end surface at an interval of 360/2n degrees centered on the rotation axis of the adjusting screw, and
the positioning plate is fixed to the case with the at least one bolt that is threaded into the female screw.

* * * * *